Sept. 20, 1938. R. S. BEGG 2,130,916
TENSION COMPENSATOR
Filed Aug. 8, 1932 2 Sheets-Sheet 2
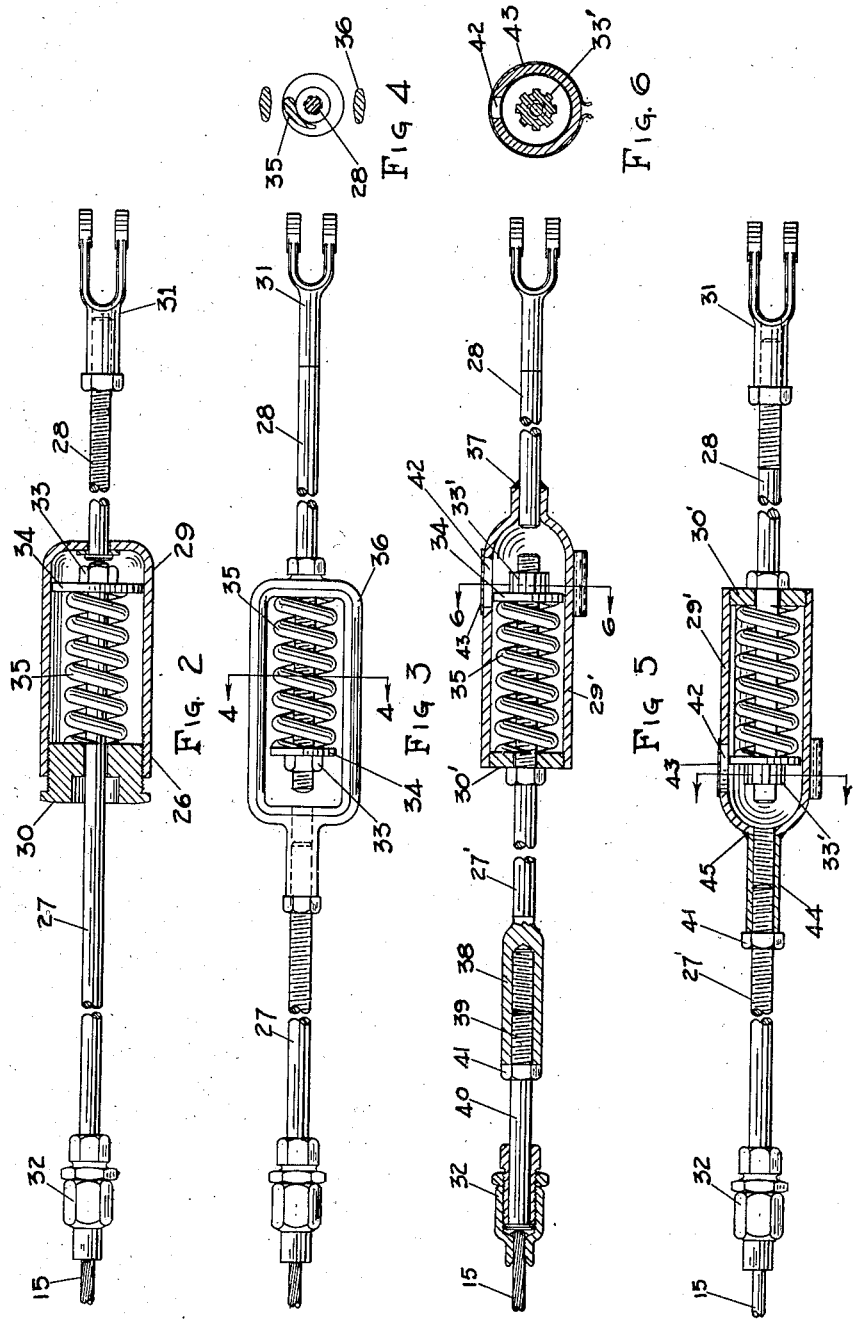
Russell S. Begg INVENTOR
BY Louis W. Helmuth
ATTORNEY Patented Sept. 20, 1938

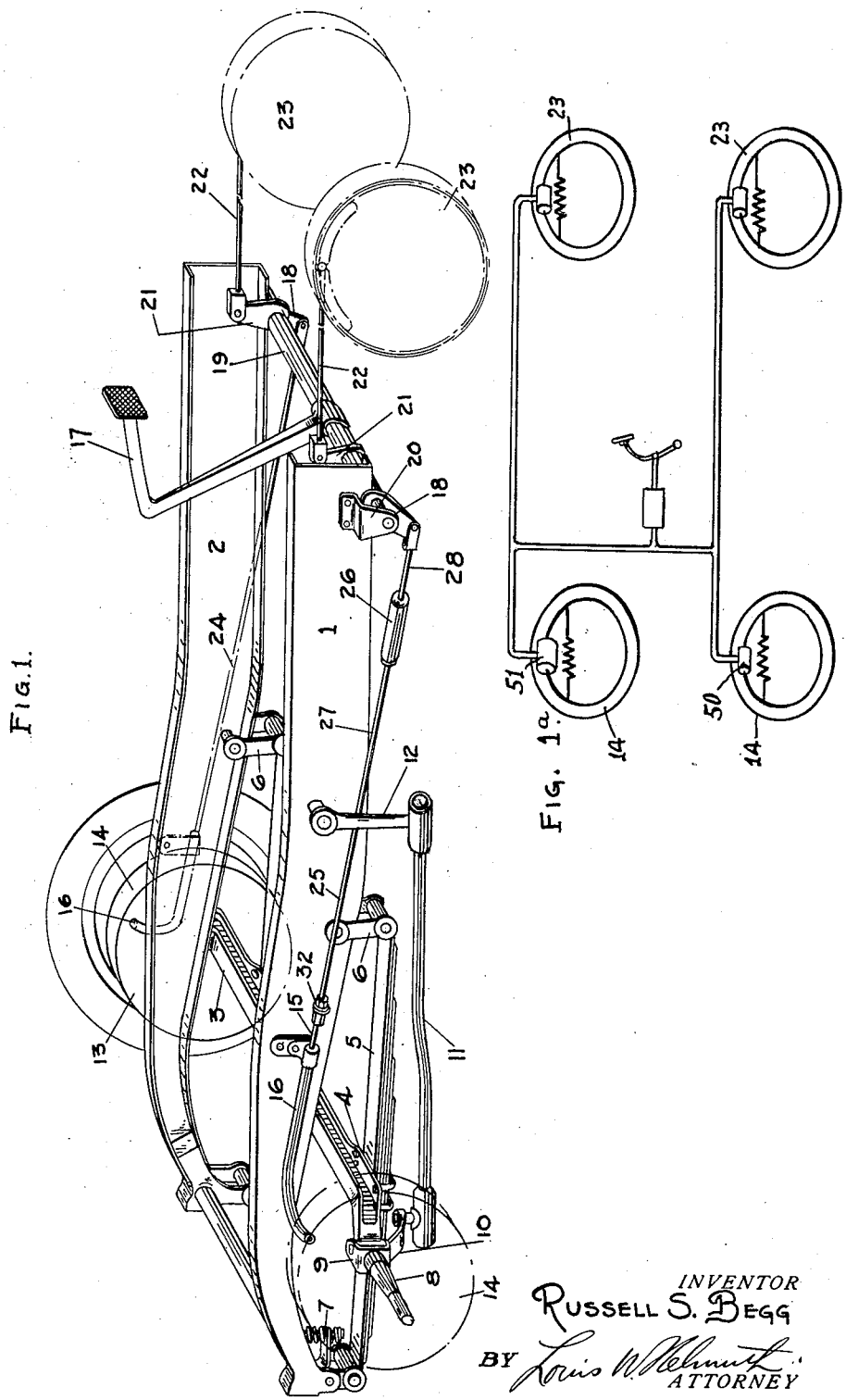

2,130,916

UNITED STATES PATENT OFFICE 2,130,916

TENSION COMPENSATOR

Russell S. Begg, Cleveland, Ohio, assignor to The Midland Steel Products Company, Cleveland, Ohio, a corporation of Ohio Application August 8, 1932, Serial No. 627,851

3 Claims. (Cl. 188—217)

This invention relates to new and useful improvements in vehicles and more particularly to the braking and steering mechanism therefor.

An important object of the invention is to provide means broadly for counteracting the adverse effects, the component parts of a vehicle have upon the steering wheels when an application of brakes is made, by controlling the efforts of braking pressures as between a pair of brake mechanisms of front wheels, to prevent the vehicle from automatically pulling or steering off of a predetermined course upon application of the brakes.

Another object of the invention is to provide means of this character which can be readily incorporated in existing brake mechanisms with practically no change in the latter.

A further object of the invention is to provide a compensating mechanism which can be readily incorporated in and be accommodated to varied makes of vehicles possessing different arrangements of parts and brake hookups.

Other objects and advantages of the invention will become apparent during the course of the following description.

In the accompanying drawings forming a part of the explanation and wherein like numerals are employed to designate like parts throughout the several views:

Fig. 1 is a perspective view, somewhat diagrammatically illustrated, of the front end of a motor vehicle, certain parts being indicated in dotted lines so as not to interfere with a clear illustration of parts of the vehicle giving rise to this invention.

Fig. 1a is a diagrammatic plan illustrating the invention adapted to hydraulic brake mechanism of motor vehicles.

Fig. 2 is a side elevation of the sectional brake rod to one brake mechanism with the tension compensator incorporated therein and shown in section.

Fig. 3 is a similar view with a modified form of compensator.

Fig. 4 is a transverse section of the same taken on the line 4—4 of Fig. 3.

Fig. 5 is a side elevation of a brake rodding or cable with another modified form of the compensator incorporated therein.

Fig. 6 is a transverse section of the same taken on the line 6—6 of Fig. 5.

Fig. 7 is a side elevation of brake rigging showing still another modification of the compensator incorporated therein.

Present automobile construction has given rise to objectionable tendencies of the vehicle to pull to one side upon application of the brakes. As the speed of the vehicle is retarded, the front end of the body and chassis dips down or dives causing flexing of the front springs with consequent rolling and shifting of the front axle. This alone, or incited by other parts or arrangements thereof, causes the vehicle to pull to one side, the severity of which depends upon the type of spring suspension and the geometry of the steering mechanism. In some makes of automobiles this tendency is more pronounced than in others and it has been found that in those employing a kick-shackle at the front end of the left front spring and a steering mechanism in which the drag link is pivoted to a steering arm at a point below the axle, there is a decided pull of the car to the left upon brake application. In such an arrangement it is believed that the kick-shackle induces the left-hand end of the axle to move rearwardly of the frame, carrying with it the left wheel spindle, which due to its pivotal connection with the drag link of the steering mechanism is caused to pivot and turn the front wheels to the left. Other arrangements may cause the car to pull or steer to one side or the other, but in any event it is proposed to counteract this objectionable feature by proportioning the braking force exerted upon the two front brake mechanisms. In the particular case illustrated, it is proposed to control the braking action of the two front wheels by causing the right front brake to be applied more severely than the left front. This may be accomplished in several ways, one being as illustrated, by installing a yielding connection in the left front brake rod.

This connection, in the present example, is loaded so as not to yield under mild brake applications since its operation is not necessary until momentum of the car reaches a point where brake application causes the front of the car to dive and cause the above results. However, upon more severe brake application to retard higher speeds, the connection will yield thereby permitting full application to the right front brake and less intensive application to the left front brake mechanism, resulting in causing a tendency of the car to swing about the right front wheel as an axis and thereby counteract the swerve to the left, to right the car and compel it to roll in the direction it is manually steered. If the geometry of the steering mechanism or other parts of the vehicle, with or without a kick shackle, causes the car to pull to one side or the other, this invention can be employed to proportion the braking force as between the front wheel brakes to overcome such tendencies and it is to be understood that the invention is not limited to the particular arrangement of parts herein shown.

Referring now more particularly to the drawings for a specific example of the manner in which the invention performs under one set of conditions, the side rails of the usual automobile chassis are designated by the numerals 1 and 2, left and right respectively, connected in the desired relationship by suitable cross members. A front axle 3 is provided with spring perches 4 by which it is connected to the front leaf springs 5 and the ends of the latter are connected to the side rails in any suitable manner but usually by spring shackles 6. In certain makes of automobiles, the left front spring 5 is connected to the side rail at its forward end by a kick-shackle 7 as illustrated. In other makes, the kick-shackle is arranged at the rear end of the spring and in others, no kick-shackle is employed. Wheel spindles 8, for the front steering wheels are connected to the ends of the axle 3 by the usual steering knuckles 9. In the present example, the left front wheel spindle has a steering arm 10, with its free end arranged beneath the front axle and is pivotally connected to a drag link 11, which in turn is connected through an arm 12 to the usual steering gear, not shown. The pivot between the drag link and steering arm, in this case, is below the axis of the wheel spindle, but in certain other cars is above or in alignment with this axis. Secured to each wheel spindle is the usual back plate 13, of a brake drum 14 rotatable with the wheel of the vehicle. Within the brake drum is provided any suitable brake mechanism adapted to make frictional contact with the drum when actuated and for the purposes of illustration, each brake mechanism is shown operated by means of a flexible cable 15 extending through a flexible conduit 16, secured at one end to the side rail and at its opposite end to the back plate 13 to guide the cable into the brake drum for connection with the brake mechanism therein.

In the usual brake rigging and operating mechanism, and more especially in the one to which this invention is directed, there is no intentional yield permitted in the connections between the cable 15 and the brake pedal or operating member 17 which is returned to brake release position by the usual spring not shown. These connections may be either rods or flexible cables, connected at their rear ends by depending arms 18, secured to the ends of a cross shaft 19, journaled in bearings 20 carried by the chassis. Cranks 21 are also secured to the cross shaft 19 and are connected to unyielding rods or flexible cables 22 extending back to the rear brake mechanism 23 associated with each of the two rear wheels; these rear brakes being illustrated more or less diagrammatically. A brake rod or cable 24 is connected to the arm 18 and to the flexible cable extending into the right front brake mechanism. A similar connection 25 is made between the other depending arm 18 and the flexible cable 15 running to the left front brake mechanism. However, a tension compensator, of any of the forms shown in Figs. 2 to 7 inclusive and designated in its entirety by the numeral 26, is interposed in the left front brake operating cable or rod so that the latter is divided into a forward section 27 and a rear section 28, the latter being connected to the left depending arm 18 of the cross shaft. It is to be particularly noted that no tension compensator 26 is installed in the brake rod 24, leading to the right front brake mechanism and this is important from the standpoint of operation, to control both front wheel brake mechanism so as not to be adversely affected by the influence of other parts of the vehicle tending to cause the same to automatically steer or pull to one side or the other upon the application of brakes.

The preferred form of tension compensator is illustrated in Fig. 2 and consists of a cylindrical casing 29, having one end internally screw threaded for the reception of a closure plug 30 and its opposite end closed for connection with the rod section 28. This connection may be either rigid or swiveled as desired and the rear end of the rod 28 is screw threaded for adjustable connection with a yoke 31, which in turn is connected to the depending arm 18 of the cross shaft. The threaded plug 30 is provided with a central aperture for the slidable reception of rod section 27, the forward end of which is connected to the rear end of the flexible cable 15, by means of a suitable coupling 32. The rear end of the rod section 27 freely passes through the closure plug 30 into the cylindrical casing 29 and terminates therein with a threaded end upon which is disposed a nut 33, backing up a washer 34 which has a free sliding fit within the casing. Surrounding the portion of the rod 27, disposed within the casing is a compression coil spring 35 having one end abutting the plug 30 and its opposite end abutting the washer 34. When the brakes are released, this spring 35 may or may not be under tension, depending upon the relation of car parts to which it is applied, and will yield to the desired degree under a braking force which would ordinarily cause the car to begin pulling off its course. Under normal braking pressures, the spring 35 is not compressed unless requirements of the car require preloading of the spring and merely serves as a rigid connection between the rod sections 27 and 28. However, upon more severe braking pressure being applied to the pedal 17, and depending upon the rate of the spring and preloading thereof, the pull on the brake rod 25 will cause the spring 35 to yield to relative braking pressure effective in the left front brake mechanism, while permitting the unyielding brake rod 24 to transmit full braking pressure to the right front brake.

This control of pressure as between two front brake mechanisms, is necessary to counteract the strong tendency of the vehicle to pull or automatically steer to the left upon severe brake applications. Without this yieldable tension compensator it has been found that a vehicle equipped as in Fig. 1 has a decided tendency to pull to the left whenever a brake application is made, which condition becomes a serious menace to the safety of passengers if not corrected. This condition as indicated above, has been traceable to four factors, namely: the kick-shackle 7; the normal axle roll upon retardation of the vehicle; the geometry of the steering mechanism and the torsional deflection of the brake shaft 19, one or more of these factors playing some part in causing the car to swerve. However the kick-shackle and geometry of the steering mechanism are believed to be the greater evils. It is obvious that other arrangements of vehicle parts, may cause the vehicle to pull toward the right instead of the left and it is to be understood that it is within the scope of the invention to apply the invention to relieve braking pressure in the brake mechanism that requires the same to prevent the objectionable pulling of the vehicle to one side or the other upon brake application. In automobiles possessing hydraulic brakes, control of the braking pressure to the individual brake mechanism of the front wheels may be achieved by varying the ratio between the brake cylinder piston areas, an example of which with the present association of parts shown in Fig. 1, would be the making of the brake cylinder 50 associated with the left front brake mechanism, smaller than the cylinder 51 associated with the other front wheel as illustrated in Fig. 1a.

Other modifications of the tension compensator are shown in Figs. 3 to 7 inclusive; Fig. 3 illustrating a substitution of an open frame 36 in place of the closed housing 29, this frame or yoke being threadedly and adjustably connected with the rod section 27, while the rod section 28 has a sliding fit through one end of the yoke and is threaded at its free end for the reception of an adjusting nut 33 and a washer 34 for varying the tension on the coil spring 35. In this modification, the nut 33 can be readily reached for adjustment purposes. If desired a rubber boot may be slipped over the yoke to exclude extraneous matter, and peeled back for adjustment purposes.

In Fig. 5 a modification similar to the form shown in Fig. 2 is illustrated in which the cylindrical housing 29' has its closed end rigidly fixed to a rod 28' by a weld 37. The rod 27' which is slidably mounted through a central aperture in a threaded closure 30' is equipped at its forward end with a threaded socket 38 for the reception of the threaded end 39 of a rod section 30 which is secured to the flexible cable 15 by means of a coupling 32. A nut 41 is threaded upon the rod section 40 and insures retention of adjustment between the rod sections 40 and 27'. The rear end of the rod section 27' is threaded for the reception of a knurled or serrated adjustment nut 33' for retaining a washer 34 in the desired position for abutment with one end of the compression spring 35. In order to reach the nut 33' for adjustment, the housing 29' is provided with an opening 42 for the insertion of a suitable tool for turning the nut to the proper adjustment without removing the plug 30'. This opening 42 is normally closed by a split band 43 which snugly embraces and frictionally engages the exterior of the casing 29' for excluding extraneous matter. The free ends of this split band are turned outwardly and arranged in spaced relation as illustrated in Fig. 6 whereby the band can be rotated upon its axis to dispose the free ends at opposite sides of the center of the opening 42 for the insertion of a suitable tool to adjust the nut 33', or if desired the band may be simply slid longitudinally on the casing 29' to uncover the opening.

In the modification shown in Fig. 7 the rod section 28 like that of Fig. 2 is adjustably connected with the yoke 31 and its forward end freely slides through the plug 30' closing the open end of the casing 29'. This casing is provided with an opening 42 for adjustment of the serrated nut 33' and a cover band 43 identical with that illustrated in Fig. 5 is provided for normally closing the opening to exclude foreign matter.

The forward end of the casing 29' in this instance may be reduced to provide an elongated tubular portion 44, or a separate small tube may be welded as at 45 to the forward end of the casing. In either event, this tubular portion is provided with interior threads for the reception of the rear end of rod section 27' which is locked in adjustment by a lock nut 41, while its forward end is coupled by the flexible cable 15 by means of the coupling 32.

It is to be understood that various changes in the arrangement of parts contemplated herein may be made without departing from the spirit of the invention or the scope of the appended claims.

I claim:

1. The combination with a vehicle having a front axle induced to move upon retardation of the vehicle, front steering spindles mounted on the axle and each having a brake mechanism associated therewith, means tending to induce shifting of the spindles upon retardation of the vehicle, an operating member, connections between the operating member and each brake mechanism; of a yieldable member interposed in the connection between the brake operating member and one of said brake mechanisms, said yielding member being unyieldable under normal brake pressure and adapted to yield under more severe brake pressure to relieve braking pressure on the associated front wheel brake mechanisms.

2. The combination with a vehicle having a front axle induced to move upon retardation of the vehicle, front steering wheels mounted on the axle and each having a brake mechanism associated therewith, steering mechanism associated with the axle and including a drag link tending to induce movement of the axle and steering of the vehicle to one side upon brake application, an operating member, a non-elastic connection between the operating member and one of the brake mechanisms; of a yielding connection between the brake operating member and the other of said brake mechanisms, said yielding connection being unyieldable under normal brake pressure and adapted to yield under severe brake pressure to relieve braking pressure on one of said front wheel brake mechanisms.

3. The combination with a vehicle frame having a front axle induced to roll upon its axis upon retardation of the vehicle, front steering wheels mounted on the axle and each having a brake mechanism associated therewith, a kick-shackle connecting the spring to the frame and tending to induce shifting of the axle and steering of the vehicle to one side upon brake application, an operating member, connections between the operating member and each brake mechanism; of an adjustable compression spring interposed in the connection between the brake operating member and only one of said brake mechanisms, said spring being adapted to yield on the application of severe braking force to relieve braking pressure on one of said front wheel brake mechanisms as the axle axis shifts.

RUSSELL S. BEGG.